Patented Oct. 23, 1934

1,978,266

UNITED STATES PATENT OFFICE 1,978,266

MANUFACTURE OF ETHYL ALCOHOL

Walter Philip Joshua, London, Herbert Muggleton Stanley, Tadworth, and John Blair Dymock, Cheam, England, assignors to The Distillers Company Limited, Edinburgh, Scotland, a British company No Drawing. Application January 11, 1933, Serial No. 651,221. In Great Britain January 29, 1932

21 Claims. (Cl. 260—156)

The present invention relates to the production of ethyl alcohol by the direct combination of ethylene with water vapor.

It is well known that water vapor and ethylene will combine with the formation of ethyl alcohol at high temperatures and without the presence of substances having a catalytic effect on the reaction but the amount of conversion is negligible. A number of catalysts have been proposed for use in this reaction such as for example thoria or phosphoric acid on charcoal.

According to the present invention, ethylene and water vapor are caused to combine at high temperatures at atmospheric or increased pressures in the presence of catalysts compounded from phosphoric acid with one or both of the elements uranium and boron or their oxides, or compounds decomposable with phosphoric acid, the amount of phosphoric acid present in the catalyst being in excess of that required to form the ortho phosphate of the element or elements employed, but not in excess of about 95 per cent. of the catalyst composition.

The catalysts so compounded may be used as such in the solid state in the form of granules, pellets, tablets and so forth or may be supported on or admixed with inert carriers, but excluding silicious compounds, or the carriers may be impregnated with the catalyst in fluid form and used in such condition or may be subsequently dried. In the case of those compositions of catalyst in which the latter becomes fluid under the operating conditions it may be used in that form, and in such case ethylene and water vapor may be passed through the catalyst. The catalysts may be used alone or in conjunction with other materials known to have a favourable catalytic effect on the combination of steam and ethylene.

The reaction may be carried out at temperatures from 100 to 300° C., but we prefer to use temperatures above 150° C. Atmospheric pressure may be employed or increased pressures up to 250 atmospheres, but we prefer to use pressures not exceeding 100 atmospheres.

In carrying out the operation a mixture of ethylene and steam in suitable proportions is brought into contact with the catalyst and the resultant vapors are thereafter condensed to separate the ethyl alcohol produced together with unchanged water vapor, and the unchanged ethylene is returned to be re-treated.

The catalyst may be prepared by treating with phosphoric acid the oxides, oxalate, carbonates or other compounds of the elements which are decomposable by phosphoric acid.

The process may be applied to pure ethylene or to mixtures of ethylene with gases which are not reactive under the conditions of the process, e. g. ethane, methane and the like.

The following examples illustrate the manner in which the invention may be carried into effect and the nature of the results obtained:—

Example I

A suspension of uranyl oxalate in water was treated with phosphoric acid in the proportion of 2.3 mols. phosphoric acid per atom of uranium. The resulting compound was baked at 200° C. and broken into granules. Over 100 cc. of this catalyst heated to 200° C. was passed ethylene at the rate of 3.12 litres per hour measured at N. T. P. in admixture with 1.5 times its volume of steam. When working under atmospheric pressure conditions the conversion of ethylene to ethanol was 0.8 per cent.

Example II

Using the same catalyst as in Example I but working under a total pressure of 20 atmospheres the volume of ethylene measured at N. T. P. passing per hour over the 100 cc. of catalyst maintained at 270° C. was 400 litres and it was mixed with steam in the molar proportions of 4 mols. ethylene to 1 mol. steam. The conversion of ethylene to ethanol was 0.37 per cent. and the hourly output of alcohol was 3.03 grams. The alcohol was obtained in the form of a 3.55% condensate.

Example III

A catalyst prepared by evaporating down one molecule of boric anhydride with 2.2 mols. of phosphoric acid was baked in an air oven at 200° C. and finally broken up into granules. Over 100 cc. of this catalyst, ethylene and steam were passed under the conditions described in Example I, when a conversion of ethylene to ethanol of 0.36 per cent. was obtained. In the treatment with this same catalyst under a total pressure of 20 atmospheres and under the conditions described in Example II the conversion of ethylene to alcohol was 0.44 per cent. and the hourly output of alcohol was 3.70 grams. The alcohol was obtained in the form of a 5.6% condensate.

What we claim is:—

1. The method of producing ethyl alcohol comprising combining ethylene with water vapor in the presence of a solid catalytic body compounded from phosphoric acid and a substance taken from a group consisting of substances containing a substantial quantity of uranium, uranium compounds, boron and boron compounds which will react with the phosphoric acid to form phosphates, the amount of the phosphoric acid present in the catalyst being in excess of the stoichiometric amount but not being in excess of about 95% of the composition.

2. The method of producing ethyl alcohol comprising combining ethylene with water vapor in the presence of a catalyst compounded from phosphoric acid and a substance containing a substantial quantity of uranium which will react with the phosphoric acid to form uranium phosphate, the amount of phosphoric acid present in the catalyst being in excess of the stoichiometric amount but not being in excess of about 95% of the composition.

3. The method of producing ethyl alcohol comprising combining ethylene with water vapor in the presence of a catalyst compounded from phosphoric acid and a substance containing a substantial quantity of boron which will react with the phosphoric acid to form the phosphate of boron, the amount of phosphoric acid present in the catalyst being in excess of the stoichiometric amount but not being in excess of about 95% of the composition.

4. The method of producing ethyl alcohol comprising combining ethylene with water vapor at elevated temperature in the presence of a catalyst, comprising essentially phosphoric acid and a substance taken from a group consisting of substances containing a substantial quantity of uranium, uranium compounds, boron and boron compounds which will react with the phosphoric acid to form phosphates, the amount of the phosphoric acid present in the catalyst being in excess of the stoichiometric amount but not being in excess of about 95% of the composition.

5. The method of producing ethyl alcohol comprising combining ethylene with water vapor at elevated temperature in the presence of a catalyst, comprising essentially phosphoric acid and a substance containing a substantial quantity of uranium which will react with the phosphoric acid to form uranium phosphate, the amount of phosphoric acid present in the catalyst being in excess of the stoichiometric amount but not being in excess of about 95% of the composition.

6. The method of producing ethyl alcohol comprising combining ethylene with water vapor at elevated temperature in the presence of a catalyst, comprising essentially phosphoric acid and a substance containing a substantial quantity of boron which will react with the phosphoric acid to form the phosphate of boron, the amount of phosphoric acid present in the catalyst being in excess of the stoichiometric amount but not being in excess of about 95% of the composition.

7. A method of producing ethyl alcohol comprising combining ethylene with water vapor in the presence of a catalyst, comprising essentially phosphoric acid and a substance containing a substantial quantity of uranium so as to combine with the phosphoric acid to form the phosphate and a substance containing a substantial quantity of boron so as to combine with the phosphoric acid to form the phosphate, the amount of phosphoric acid present in the catalyst being in excess of the stoichiometric amount, but not being in excess of about 95% of the composition.

8. The method of producing ethyl alcohol comprising combining ethylene with water vapor at elevated temperature between 100° C. and 300° C. in the presence of a catalyst comprising essentially phosphoric acid and a substance taken from a group consisting of substances containing a substantial quantity of uranium, uranium compounds, boron and boron compounds which will react with the phosphoric acid to form phosphates, the amount of the phosphoric acid present in the catalyst being in excess of the stoichiometric amount but not being in excess of about 95% of the composition.

9. The method of producing ethyl alcohol comprising combining ethylene with water vapor at elevated temperature between 100° C. and 300° C. in the presence of a catalyst comprising essentially phosphoric acid and a substance containing a substantial quantity of uranium which will react with the phosphoric acid to form uranium phosphate, the amount of phosphoric acid present in the catalyst being in excess of the stoichiometric amount but not being in excess of about 95% of the composition.

10. The method of producing ethyl alcohol comprising combining ethylene with water vapor at elevated temperature between 100° C. and 300° C. in the presence of a catalyst comprising essentially phosphoric acid and a substance containing a substantial quantity of boron which will react with the phosphoric acid to form the phosphate of boron, the amount of phosphoric acid present in the catalyst being in excess of the stoichiometric amount but not being in excess of about 95% of the composition.

11. The method of producing ethyl alcohol comprising combining ethylene with water vapor at elevated temperature between 100° C. and 300° C. in the presence of a catalyst comprising essentially phosphoric acid and a substance containing a substantial quantity of uranium so as to combine with the phosphoric acid to form the phosphate and a substance containing a substantial quantity of boron so as to combine with the phosphoric acid to form the phosphate, the amount of phosphoric acid present in the catalyst being in excess of the stoichiometric amount, but not being in excess of about 95% of the composition.

12. The method of producing ethyl alcohol comprising combining ethylene with water vapor at elevated temperature and at atmospheric pressure in the presence of a catalyst comprising essentially phosphoric acid and a substance taken from a group consisting of substances containing a substantial quantity of uranium, uranium compounds, boron and boron compounds which will react with the phosphoric acid to form phosphates, the amount of the phosphoric acid present in the catalyst being in excess of the stoichiometric amount but not being in excess of about 95% of the composition.

13. The method of producing ethyl alcohol comprising combining ethylene with water vapor at elevated temperature and at atmospheric pressure in the presence of a catalyst comprising essentially phosphoric acid and a substance containing a substantial quantity of uranium which will react with the phosphoric acid to form uranium phosphate, the amount of phosphoric acid present in the catalyst being in excess of the stoichiometric amount but not being in excess of about 95% of the composition.

14. The method of producing ethyl alcohol comprising combining ethylene with water vapor at elevated temperature and at atmospheric pressure in the presence of a catalyst comprising essentially phosphoric acid and a substance containing a substantial quantity of boron which will react with the phosphoric acid to form the phosphate of boron, the amount of phosphoric acid present in the catalyst being in excess of the stoichiometric amount but not being in excess of about 95% of the composition.

15. The method of producing ethyl alcohol comprising combining ethylene with water vapor at elevated temperature and at atmospheric pressure in the presence of a catalyst comprising essentially phosphoric acid and a substance containing a substantial quantity of uranium so as to combine with the phosphoric acid to form the phosphate and a substance containing a substantial quantity of boron so as to combine with the phosphoric acid to form the phosphate, the amount of phosphoric acid present in the catalyst being in excess of the stoichiometric amount, but not being in excess of about 95% of the composition.

16. The method of producing ethyl alcohol comprising combining ethylene with water vapor at elevated temperature and at super-atmospheric pressure up to about 100 atmospheres in the presence of a catalyst comprising essentially phosphoric acid and a substance taken from a group consisting of substances containing a substantial quantity of uranium, uranium compounds, boron and boron compounds which will react with the phosphoric acid to form phosphates, the amount of the phosphoric acid present in the catalyst being in excess of the stoichiometric amount but not being in excess of about 95% of the composition.

17. The method of producing ethyl alcohol comprising combining ethylene with water vapor at elevated temperature and at super-atmospheric pressure up to about 100 atmospheres in the presence of a catalyst comprising essentially phosphoric acid and a substance containing a substantial quantity of uranium which will react with the phosphoric acid to form uranium phosphate, the amount of phosphoric acid present in the catalyst being in excess of the stoichiometric amount but not being in excess of about 95% of the composition.

18. The method of producing ethyl alcohol comprising combining ethylene with water vapor at elevated temperature and at super-atmospheric pressure up to about 100 atmospheres in the presence of a catalyst comprising essentially phosphoric acid and a substance containing a substantial quantity of boron which will react with the phosphoric acid to form the phosphate of boron, the amount of phosphoric acid present in the catalyst being in excess of the stoichiometric amount but not being in excess of about 95% of the composition.

19. The method of producing ethyl alcohol comprising combining ethylene with water vapor at elevated temperature and at super-atmospheric pressure up to about 100 atmospheres in the presence of a catalyst comprising essentially phosphoric acid and a substance containing a substantial quantity of uranium so as to combine with the phosphoric acid to form the phosphate and a substance containing a substantial quantity of boron so as to combine with the phosphoric acid to form the phosphate, the amount of phosphoric acid present in the catalyst being in excess of the stoichiometric amount, but not being in excess of about 95% of the composition.

20. The method of producing ethyl alcohol comprising combining ethylene in admixture with a gaseous medium not reactive under the operating conditions with water vapor at elevated temperature in the presence of a catalyst comprising essentially phosphoric acid and a substance taken from a group consisting of substances containing a substantial quantity of uranium, uranium compounds, boron and boron compounds which will react with the phosphoric acid to form phosphates, the amount of the phosphoric acid present in the catalyst being in excess of the stoichiometric amount but not being in excess of about 95% of the composition.

21. The method of producing ethyl alcohol comprising combining ethylene in admixture with a gaseous medium not reactive under the operating conditions with water vapor at elevated temperature in the presence of a catalyst comprising essentially phosphoric acid and a substance containing a substantial quantity of uranium so as to combine with the phosphoric acid to form the phosphate and a substance containing a substantial quantity of boron so as to combine with the phosphoric acid to form the phosphate, the amount of phosphoric acid present in the catalyst being in excess of the stoichiometric amount, but not being in excess of about 95% of the composition.

WALTER PHILIP JOSHUA.
HERBERT MUGGLETON STANLEY.
JOHN BLAIR DYMOCK.